United States Patent [19]

Kubota et al.

[11] 4,305,285

[45] Dec. 15, 1981

[54] LIQUID LEVEL DETECTING AND WARNING DEVICE

[75] Inventors: Hitoshi Kubota, Fujisawa; Hironori Kutsuma, Yokohama; Toshiyuki Takahashi, Kanagawa, all of Japan

[73] Assignees: Nissan Motor Co., Ltd.; Nippon Air Brake Co., Ltd.; Tokico Ltd., all of Kanagawa, Japan

[21] Appl. No.: 154,860

[22] Filed: May 30, 1980

[30] Foreign Application Priority Data

Jun. 7, 1979 [JP] Japan ................................ 54-71488

[51] Int. Cl.[3] ..................... H01H 36/02; B60T 17/22; G01F 23/12; H01H 35/18

[52] U.S. Cl. ........................................ 73/308; 73/313; 200/84 C; 200/303; 340/52 C; 340/59; 340/623

[58] Field of Search ................ 73/307, 308, 313, 431; 200/84 R-84 C, 293, 303; 340/52 R-52 C, 59, 60, 620, 623-625

[56] References Cited

U.S. PATENT DOCUMENTS

| | | | |
|---|---|---|---|
| 3,609,680 | 9/1971 | Belart | 340/59 |
| 3,654,956 | 4/1972 | Tsubouchi | 340/59 X |
| 3,751,614 | 8/1973 | Jones | 200/84 C |
| 3,751,616 | 8/1973 | Innes et al. | 200/84 C |
| 3,947,813 | 3/1976 | Uemura et al. | 340/59 |
| 3,964,079 | 6/1976 | Katagiri et al. | 340/59 X |
| 4,037,193 | 7/1977 | Uemura | 340/59 |

FOREIGN PATENT DOCUMENTS 1264200 2/1972 United Kingdom .

*Primary Examiner*—John Petrakes

*Attorney, Agent, or Firm*—Schwartz, Jeffery, Schwaab, Mack, Blumenthal & Koch

[57] ABSTRACT

A liquid level detecting and warning device of the kind including a tubular member having a mounting portion fitted on an opening of a reservoir and a float guiding portion downwardly extending from the mounting portion, a float having a magnet and slidably fitted around the float guiding portion, a reed switch disposed within the float guiding portion, terminals connected to the reed switch through lead wires, and a cover member covering the opening of the reservoir and the mounting portion of the tubular member. The tubular member is formed to have at least two projection radially outwardly projecting from the upper end portion thereof. The cover member is formed to have an upper cover portion provided with a terminal retaining portion locating and retaining the upper sides of the terminals and a radial recess for receiving therein one radial projection formed on the upper end of the mounting portion, and a lower cover portion connected to the upper cover portion and provided with a terminal retaining portion supporting the lower sides of the terminals and a radial projecting portion cooperating with the upper cover portion to clamp therebetween the other radial projection formed on the upper end of the mounting portion.

5 Claims, 8 Drawing Figures

20'
16
95
104
VI
VI
102
96
40'
30

40'
95
96
104
102
16
20'
18
30

70
68
76
58
60
100
72
56
78
VIII
VIII
50
66
64
22'

22'
46
52
52
50
98
86
90
88
80
48
90
54
56

LIQUID LEVEL DETECTING AND WARNING DEVICE

BACKGROUND OF THE INVENTION

This invention relates to a liquid level detecting and warning device for use with a reservoir of a master cylinder of a vehicle hydraulic braking system, wherein when the liquid level in the reservoir decreases to a predetermined level, the device generates a warning signal.

One conventional liquid level detecting and warning device includes contact points provided respectively on a float and an member secured to the body of the reservoir such as a cover member so that the contact points mechanically contact with one another to generate the warning signal, however, there is a shortcoming that the contact points will be contaminated by the working liquid, thereby decreasing the operational reliability. There has been proposed to utilize a reed switch actuated by a magnet incorporated in the float for improving the sealingness of the contact points. However, in the prior art device, connecting terminals which are connected to the reed switch through lead wires have not been fixed to the cover member, thus, it has been difficult to connect the connecting terminals of the warning device to connecting terminals provided on the vehicle, and the lead wires connected to the reed switch have sometimes be broken.

SUMMARY OF THE INVENTION

An object of the present invention is to provide a liquid level detecting and warning device eliminating the shortcomings aforementioned and, the device according to the invention includes a tubular member having a mounting portion fitted in an opening of a reservoir and a float guiding portion downwardly extending from the mounting portion, a float having a magnet and slidably fitted around the float guiding portion, a reed switch disposed within the float guiding portion, terminals connected to the reed switch through lead wires, and a cover member covering the opening of the reservoir and the mounting portion of the tubular member. The tubular member includes at least two projection radially outwardly projecting from the upper end portion thereof. The cover member includes an upper cover portion provided with a terminal retaining portion locating and retaining the upper sides of the terminals and a radial recess for receiving therein one radial projection formed on the upper end of the mounting portion, and a lower cover portion connected to the upper cover portion and provided with a terminal retaining portion supporting the lower sides of the terminals and a radial projecting portion cooperating with the upper cover portion to clamp therebetween the other radial projection formed on the upper end of the mounting portion.

BRIEF DESCRIPTION OF THE DRAWINGS

For a better understanding of the invention, reference will now be made to the accompanying drawings, in which.

DETAILED DESCRIPTION OF THE PREFERRED EMBODIMENTS

Figure 1:
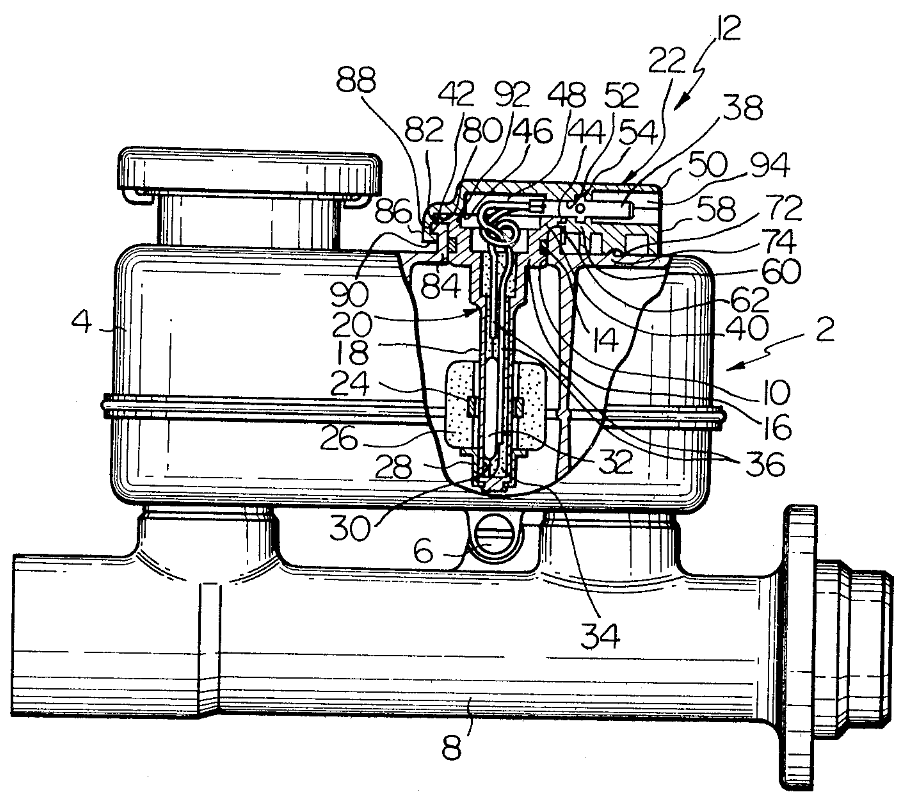
FIG. 1 is a longitudinal sectional view of the essential portion of a liquid level detecting and warning device according to the invention.

In FIG. 1, there is illustrated a tandem master cylinder 2 for use in a vehicle hydraulic braking system. The master cylinder 2 includes a reservoir 4 secured to a main body 8 by a bolt 6, and a liquid level detecting and warning device 12 according to the invention is mounted on an opening 10 of the reservoir 4.

The liquid level detecting and warning device 12 comprises a tubular member 20 formed of a synthetic resin material and having a mounting portion 16 fitted on the opening 10 interposing therebetween a seal 14, and a float guiding portion 18 downwardly extending from the mounting portion 16. A cover member 22 formed of a synthetic resin material covers the upper side of the tubular member 20.

A float 26 having a magnet 24 on the inner circumference thereof is slidably fitted around the outer circumference of the float guiding portion 18 of the tubular member 20. A stop 28 is provided on the lower end of the float guiding portion 18 to restrict the downward movement of the float 26 with respect to the tubular member 20. A bore 30 is formed in the float guiding portion 18 to receive therein a reed switch 32. The switch 32 is located in the bore 30 at a position such that the switch is actuated to close the circuit by the magnet 24 when the float 26 is at the lowermost position engaging with the stop 28. The switch 32 is secured in its position by filler material 34 and is connected to terminals 38 through lead wires 36 and 36.

Figure 2:
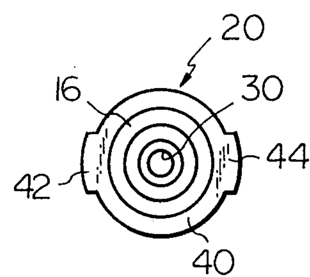
FIG. 2 is a top plan view of a tubular member of FIG. 1.

On the upper periphery of the mounting portion 16 of the tubular member 20, an annular flange 40 is formed as shown in FIG. 2, and the flange 40 has thin thickness projections 42 and 44 symmetrically projecting therefrom in the radial directions.

Figure 3:
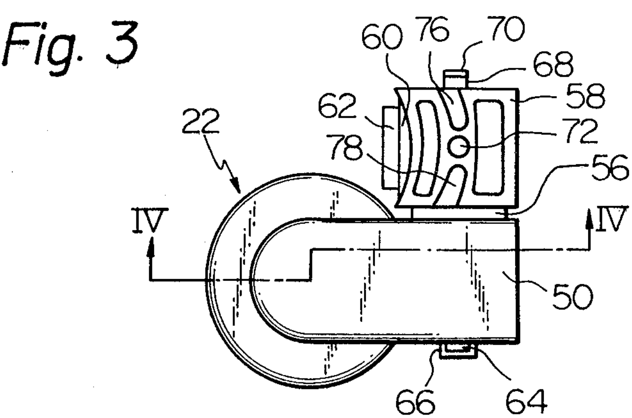
FIG. 3 is a plan view of a cover member of FIG. 1 which is shown in the disassembled condition.
Figure 4:
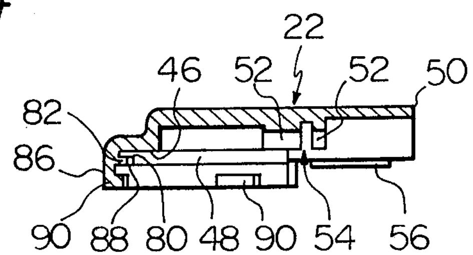
FIG. 4 is a sectional view taken along line IV—IV in FIG. 3.
Figure 5:
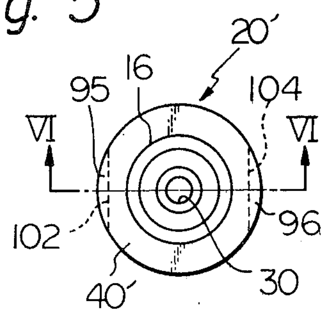
FIG. 5 is a view similar to FIG. 2 but showing a second embodiment of the invention.
Figure 6:
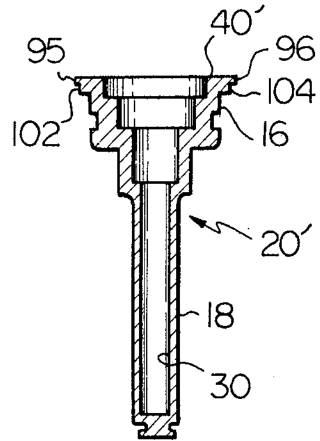
FIG. 6 is a sectional view taken along line VI—VI in FIG. 5.
Figure 7:
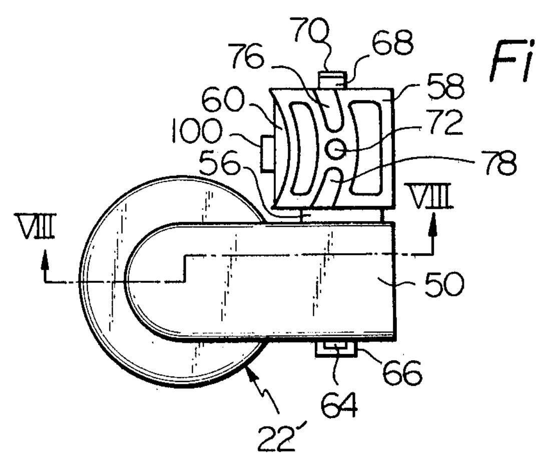
FIG. 7 is a view similar to FIG. 3 but showing the second embodiment of the invention.
Figure 8:
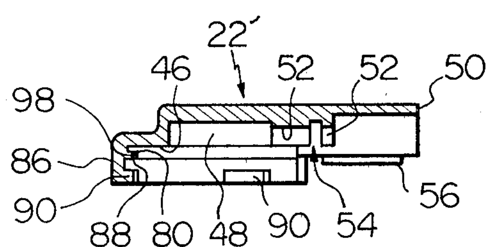
FIG. 8 is a sectional view taken along line VIII—VIII in FIG. 7.

The cover member 22 comprises an upper cover portion 50 covering the upper end of the tubular member 20 with a recess 48 being defined therein and also extending therefrom generally in the rightward direction as viewed in FIGS. 1 and 4, and a lower cover portion 58 integrally connected to the upper cover portion through a thin thickness flexible portion 56 which is shown in FIGS. 3 and 4. A flat surface portion 46 is formed in the recess 48 to abut with the upper end surface of the mounting portion 16 of the tubular member 20. On the right side of the recess 48 of the upper cover portion 50 as viewed in FIG. 1, there is provided a terminal retaining portion 54 having grooves 52 which are adapted to fittingly receive respective terminals 38. The upper cover portion 50 has a form of generally inverted U-shape as viewed from the right side of FIG. 1 so as to cover the upper sides of the terminals 38.

The flexible portion 56 allows the rocking movement of the lower cover portion 58 therearound so that the lower cover portion can move between the position shown in FIG. 3 and the position of FIG. 1 wherein the lower cover portion 58 engages with the lower surface of the upper cover portion 50 and also with the upper surface of the reservoir 4 which is hereinafter referred as an assembled position. There is provided a terminal retaining portion 60 in the lower cover portion 58 to cooperate with the terminal retaining portion 54 in the upper cover portion 50 in supporting the terminals 38 in the assembled position.

For retaining the lower cover portion 58 in the assembled position, there is provided on a side wall of the upper cover portion 50 a projecting portion 66 having an opening 64 and, on the lower cover portion 58, a resiliently deformable leg 68 having a pawl 70 on the distal end thereof.

The lower cover portion 58 further includes a plate-like projecting portion 62 on the left side as viewed in FIG. 3, a semi-spherically shaped recess 72 for engaging with a semi-spherically shaped projection 74 formed on the upper wall of the reservoir 4, and generally arcuated guiding grooves 76 and 78 on the opposite sides of the recess 72 having the function which will hereinafter be described.

The cover member 22 further includes a radial recess 80 having the configuration corresponding to the projection 42 of the mounting portion 16, and the upper side of the recess 80 is defined by the flat surface portion 46 and the lower side thereof is defined by a projecting portion 82 having the configuration corresponding to the projection 42.

The reservoir 4 has an upwardly extending tubular portion 84 to define the opening 10, and a skirt portion 86 is formed on the lower side of the cover member 22 to encircle the tubular portion 84.

A plurality of (three in the embodiment) circumferentially spaced and radially outwardly extending projections 92 are formed on the upper end of the tubular portion 84 of the reservoir 4, and a plurality of (three in the embodiment) circumferentially spaced and radially inwardly extending projections 90 are formed on the lower end of the skirt portion 86 of the cover member 22. The projections 90 and 92 cooperate to form a bayonet connection.

In the assembled condition shown in FIG. 1, the upper and lower cover portions 50 and 58 cooperate to form a connector receiving opening 94 for allowing the insertion of a connector (not shown) from the outside which is adapted to be connected to the terminals 38.

The tubular member 20 and the cover member 22 of the liquid level detecting device 12 are connected as follows.

Firstly, two terminals 38 are respectively fitted in respective grooves 52 in the terminal retaining portion 54 of the upper cover portion 50 of the cover member 22, then, the upper end surface of the mounting portion 16 of the tubular member 20 is located to abut with the flat surface portion 46 of the cover member 22 with one of the projection 42 being received in the radial recess 80. The margin portions of lead wires 36 are suitably located in the recess 48 in the cover member 22 and in a large diameter bore portion formed in the mounting portion 16 of the tubular member 20. Thereafter, the lower cover portion 58 is displaced to the assembled position by deflecting the thin thickness portion 56, with the leg 68 of the lower cover portion being inserted into the opening 64 in the projecting portion 66 of the upper cover portion 50 and the pawl 70 of the leg 58 engaging with the projection 66. The projection 44 of the mounting portion 16 is clamped between the lower surface of the terminal retaining portion 54 (which is coplaner with the flat surface portion 46) and the projecting portion 62 of the lower cover portion 58. The terminal retaining portion 60 of the lower cover portion 58 engages with the terminals 38 and with the terminal retaining portion 54.

The projection 42 is received in the recess 80 and the projection 44 is clamped between the upper end lower cover portions 50 and 58, thus, the tubular member 20 is firmly connected to the cover member 22.

The tubular member 20 connected with the cover member 22 is mounted on the reservoir 4 under the following procedure.

The tubular member 20 having thereon the float 26 is inserted through the opening 10 and into the reservoir 4. The relative angular position of the cover member 22 and the reservoir 4 is determined such that the projections 90 of the skirt portion 86 of the cover member can downwardly pass through respectively through circumferential spaces between the projections 92 of the tubular portion 84. By downwardly pressing the cover member 22 as viewed in FIG. 1, the mounting portion 16 is fitted in the opening 10 of the reservoir 4, with the lower end surface of the flange 40 of the mounting portion 16, a flat surface portion 88 of the skirt 86, and the lower surface of the plate-like projecting portion 62 engaging with the upper end surface of the tubular portion 84.

The device 12 is, thereafter, rotated around the vertical axis of the tubular portion 84 so that the projection 92 of the tubular portion 84 is located between the flat surface portion 88 of the skirt portion 86 and the projection 90. The projection 74 of the reservoir 4 is guided along the arcuate groove 76 or 78 and engages with the recess 72 in the lower cover portion 58. The engagement of the projection 74 with the recess 72 reliably prevents the rotation of the cover member 22 around the reservoir 4, thereby preventing accidental disengagement of the bayonet connection consisting of the projections 90 and 92.

In disassembling the device 12 from the reservoir 4, the device 12 is forcibly rotated in the opening 10 so as to, firstly, disengage the projection 74 from the recess 72 and, secondly, locate the projections 90 on the skirt portion 86 between the projections 92 on the tubular portion 84 (releasing the bayonet connection). Then the device 12 is pulled in the vertical upward direction, thereby dismounting the device 12 from the reservoir 4.

It will be understood that the mounting or the dismounting operation of the device 12 on the reservoir 4 can very easily be performed since the tubular member 20 and the cover member 22 are firmly connected with one another. Further, the lead wires 36 will not accidentally be broken in the mounting or dismounting operations. The tubular member 22 and the cover member 20 are connected with one another by providing projections 42 and 44 on the tubular member 22, with one of the projections 42 being snugly received in corresponding recess 80 and the other projection 44 being clamped between the upper and lower cover portions 50 and 58. The connecting operations can very easily be performed without complicating the construction of the members 20 and 22. The tubular member 20 and the cover member 22 can easily be formed by a molding process and the molding characteristics thereof are excellent. The upper and the lower cover portions 50 and 58 can easily be disassembled by disengaging the pawl 70 on the leg 68 from the projecting portion 66 of the upper cover portion 50.

In the first embodiment described as above the projections 42 and 44 of the tubular member 20 are formed by marginal projections formed on the flange 40 of the tubular member 20, however, the projections 42 and 44 are modified in a second embodiment illustrated in FIGS. 5–8, wherein parts corresponding to the first embodiment are denoted by the same reference numerals, and the description therefor are omitted.

In the second embodiment shown in FIGS. 5–8, projections 95 and 96 corresponding to the projections 42 and 44 in the first embodiment are formed respectively on the upper end of the tubular member 20' by cutting respective portions of annular flange 40' of the member 20' along broken lines 102 and 104 with the thickness thereof being thinner than the remaining portion of the flange 40'. The cover member 22' has a recess 80 corresponding to the projection 95 in the recess 48, and a plate-like projecting portion 100 on the left end of the lower cover portion 58 as viewed in FIG. 7. The recess 80 is defined by the flat surface portion 46 and a projection 98 which is formed on the inner circumference of the recess 48 and having the configuration corresponding to the projection 95 so that the inner or the right side in FIG. 7 thereof abut with a flat surface portion (depicted by 102 by FIG. 6) of the flange 40', and the rotation of the tubular member with respect to the cover member can reliably be prevented.

The tubular member 20' and the cover member 22' are connected in a manner similar to the first embodiment, such that the projection 95 is firstly received in the recess 80, and the lower cover portion 58 is moved to the assembled position by deflecting the thin thickness portion 56 so as to clamp the projection 96 between the terminal retaining portion 54 and the plate-like projecting portion 100.

Since the flat surface portions 102 and 104 of the tubular member 20' abut respectively with the radially inner edges of the projections 98 and 100 of the cover member 22, the relative rotation therebetween can reliably be prevented in the assembled condition.

Although the invention has heretofore been described in detail with respect to the preferred embodiments, it will be understood by those skilled in the art that various modifications or changes may be made without departing from the spirit of the invention. For example, the recess in the cover member with which the projection of the tubular member engages is not limited to a single projection 42, and two or more projections may be provided to engage with corresponding recesses. Further, the lower cover portion may be formed separately from the upper cover portion having a suitable connecting means for releasably connecting the lower cover portion to the upper cover portion.

As described heretofore, the liquid level detecting and warning device according to the invention enables to easily, releasably and firmly connect the tubular member and the cover member without complicating the construction thereof, thereby improving the working property in the assembling operation.

What is claimed is:

1. A liquid level detecting and warning device including a tubular member having a mounting portion fitted in an opening of a reservoir and a float guiding portion downwardly extending from the mounting portion, a float having a magnet and slidably fitted around the float guiding portion, a reed switch disposed within the float guiding portion, terminals connected to the reed switch through lead wires, and a cover member covering the opening of the reservoir and the mounting portion of the tubular member, wherein the tubular member includes at least two projections radially outwardly projecting from the upper end portion thereof, the cover member includes an upper cover portion provided with a terminal retaining portion locating and retaining the upper sides of said terminals and a radial recess for receiving therein one of the radial projections formed on the upper end of said mounting portion, and a lower cover portion connected to the upper cover portion and provided with a terminal retaining portion supporting the lower sides of the terminals and a radial projecting portion cooperating with the upper cover portion to clamp therebetween the other radial projection formed on the upper end of said mounting portion.

2. A liquid level detecting and warning device as set forth in claim 1 wherein the cover member is made of a synthetic resin material with the upper and lower cover portions being connected through a thin thickness flexible portion.

3. A liquid level detecting and warning device as set forth in claim 1 wherein said projections on the upper end of the mounting portion of the tubular member extend respectively in the opposite directions.

4. A liquid level detecting and warning device as set forth in claim 1 wherein the upper end of the mounting portion of the tubular member abuts with a flat surface portion formed in the cover member.

5. A liquid level detecting and warning device as set forth in claim 1 wherein the device is mounted on a tubular portion of the reservoir defining said opening through a bayonet connection formed between a skirt portion of the cover member and the upper end of the tubular portion of the reservoir.

* * * * *